US006980669B1

(12) United States Patent
Uchida

(10) Patent No.: US 6,980,669 B1
(45) Date of Patent: Dec. 27, 2005

(54) USER AUTHENTICATION APPARATUS WHICH USES BIOMETRICS AND USER AUTHENTICATION METHOD FOR USE WITH USER AUTHENTICATION APPARATUS

(75) Inventor: Kaoru Uchida, Tokyo (JP)

(73) Assignee: NEC Corporation, Tokyo (JP)

( * ) Notice: Subject to any disclaimer, the term of this patent is extended or adjusted under 35 U.S.C. 154(b) by 510 days.

(21) Appl. No.: 09/722,964

(22) Filed: Nov. 27, 2000

(30) Foreign Application Priority Data

Dec. 8, 1999 (JP) ................................ 11-348268

(51) Int. Cl.[7] ................................................ G06K 9/00
(52) U.S. Cl. ...................................... 382/115; 713/186
(58) Field of Search ............ 382/115–127; 283/68–69; 356/71; 713/183, 186

(56) References Cited

U.S. PATENT DOCUMENTS

| | | | | |
|---|---|---|---|---|
| 5,799,098 A * | 8/1998 | Ort et al. | .................... | 382/125 |
| 5,815,252 A * | 9/1998 | Price-Francis | ............... | 356/71 |
| 5,933,515 A * | 8/1999 | Pu et al. | ..................... | 382/124 |
| 5,963,656 A * | 10/1999 | Bolle et al. | ................. | 382/124 |
| 5,999,637 A * | 12/1999 | Toyoda et al. | .............. | 382/124 |
| 6,072,891 A * | 6/2000 | Hamid et al. | ............... | 382/116 |
| 6,078,265 A * | 6/2000 | Bonder et al. | ............. | 340/5.23 |
| 6,141,436 A * | 10/2000 | Srey et al. | .................. | 382/124 |
| 6,160,903 A * | 12/2000 | Hamid et al. | ............... | 382/115 |

(Continued)

FOREIGN PATENT DOCUMENTS

| | | |
|---|---|---|
| GB | 2 345371 A | 7/2000 |
| JP | 33065/1992 | 2/1992 |
| JP | 4-123276 | 4/1992 |
| JP | 9-160589 | 6/1997 |

(Continued)

OTHER PUBLICATIONS

Hiroshi Asai, Yukio Hoshino and Kaxuo Kiji, " Automated Fingerprint Identification by Minutiae-Network Feature —Feature Extraction Processes—", the Transactions of the Institute of Electronics, Information, and Communication Engineers of Japan, vol. J72-D-II, No. 5, May, 1989, pp. 724-732.

(Continued)

*Primary Examiner*—Bhavesh M. Mehta
*Assistant Examiner*—Aaron Carter
(74) *Attorney, Agent, or Firm*—Scully Scott Murphy & Presser

(57) ABSTRACT

A user authentication apparatus is disclosed by which, even where biometrics input data of some user such as a fingerprint are low in quality and are not suitable for verification, the security of the entire system can be augmented without giving rise to increase of the cost by introduction of significant additional hardware. When a fingerprint verifying characteristic extraction section discriminates that the quality of an image of a fingerprint is insufficient or when authentication based on an inputted fingerprint by a user verification result determination section results in failure, a request to input a fingerprint is issued from a fingerprint inputting request section to the user. When necessary fingerprint inputting is performed from a fingerprint inputting section, substitute authentication by a substitute authentication section is permitted. A result of the substitute authentication by the substitute authentication section is displayed on a service permission or rejection display section. The image inputted from a fingerprint inputting section or the fingerprint inputting section is stored into a substitute authentication means user information storage section.

16 Claims, 6 Drawing Sheets

U.S. PATENT DOCUMENTS

| | | | | |
|---|---|---|---|---|
| 6,195,447 | B1 * | 2/2001 | Ross | 382/125 |
| 6,259,805 | B1 * | 7/2001 | Freedman et al. | 382/124 |
| 6,430,306 | B2 * | 8/2002 | Slocum et al. | 382/118 |

FOREIGN PATENT DOCUMENTS

| | | |
|---|---|---|
| JP | 9-282282 | 10/1997 |
| JP | 10-275233 | 10/1998 |
| JP | 11-73395 | 3/1999 |
| JP | 11-85994 | 3/1999 |
| JP | 11-143707 | 5/1999 |

OTHER PUBLICATIONS

Hiroshi Asai, Yukio and Hoshino Kazuo Kiji, "Automated Fingerprint Identification by Minutiae-Network Feature —Verification Processes—", the Transactions of the Institute of Electronics, Information, and Communication Engineers of Japan, vol. J72-D-II, No. 5, May, 1989, pp. 733-740.

* cited by examiner

USER AUTHENTICATION APPARATUS WHICH USES BIOMETRICS AND USER AUTHENTICATION METHOD FOR USE WITH USER AUTHENTICATION APPARATUS

BACKGROUND OF THE INVENTION

1. Field of the Invention

The present invention relates to a user authentication apparatus which uses biometrics and a user authentication method for use with the user authentication apparatus, and more particularly to a method wherein a user itself is authenticated with biometrics such as a finger print upon management of physical accessing at a gate or the like or upon management of information accessing on a terminal such as a personal computer.

2. Description of the Related Art

Conventionally, a user authentication method is used to confirm whether or not a user who manages physical accessing at a gate for entrance or the like or manages an information access right on a terminal such as a personal computer is the person itself.

In the user authentication method, authentication based on biometrics is used in addition to a method of performing authentication depending upon whether or not the user holds its possessed article such as a magnetic card or whether or not the user knows secret knowledge such as a personal identification number or a password.

Authentication based on biometrics makes use of a biological characteristic unique to each individual such as a fingerprint. A fingerprint is a pattern of the skin at a fingertip of the human being. It is known that the fingerprint has characteristics that "it is different among different people" and "it does not vary till the end of the person's life". Even if the cuticle of a fingertip is damaged, the same fingerprint restores to the original state from the invariable corium in the interior of the cuticle. Therefore, the fingerprint is widely known as biometrics that allows accurate identification of an individual.

For example, in a user authentication process when someone requests for accessing, the person is urged to input its fingerprint. When a fingerprint is inputted, it can be used in the following manner. In particular, if the fingerprint coincides with a registered fingerprint, then the accessing is permitted, but if the fingerprint does not coincide with the registered fingerprint, then it is determined that the person is an illegal user and the accessing of the person is not permitted.

Where authentication based on a possessed article is used, an unrelated person who picked up the possessed article can use it. Also where authentication based on knowledge is used, if a person who looked furtively at or made a random guess of the knowledge inputs the knowledge, then it can acquire illegal accessing permission. In contrast, according to the method that is based on biometrics, a function that the true person itself can obtain authentication is realized.

Such a technique as described above is disclosed, for example, in Japanese Patent Laid-Open No. 33065/1992.

In the conventional user authentication method described above, where a system is employed wherein biometrics such as, for example, a fingerprint is inputted and compared with registered verification characteristics to confirm the person itself, presence of a user with whom registration or verification does not result in success when the quality of the fingerprint image is deteriorated by drying of or damage to the finger or the like cannot be ignored.

When registration or verification of a fingerprint does not result in success, typically an evading method which substitutes another authentication scheme such as, for example, inputting of a password is used. According the method, a fingerprint is inputted, and if it does not have a quality sufficient to allow automatic verification, then automatic authentication based on the fingerprint is given up and a password is inputted from a keyboard as substitute measures. However, where a password is used, an unrelated person can pose as the person itself through furtive looking or the like as described hereinabove. This makes a security hole to the entire system, which is a disadvantage of the method described above.

Naturally, it is a possible idea to additionally use, where a fingerprint is not suitable for automatic authentication, verification based on some other biometrics such as, for example, the iris. In this instance, however, an additional cost for installation and operation of an inputting apparatus for an iris image such as a camera, an illumination system for obtaining a stabilized image and so forth is required, and increase of the cost cannot be avoided.

SUMMARY OF THE INVENTION

It is an object of the present invention to provide a user authentication method and a user authentication apparatus by which, even where biometrics input data of some user such as a fingerprint are low in quality and are not suitable for verification, the security of the entire system can be augmented without giving rise to increase of the cost by introduction of significant additional hardware.

In order to attain the object described above, according to an aspect of the present invention, there is provided a user authentication apparatus, comprising authentication means for authenticating a user by verification of biometrics of the user which is a biological characteristic unique to an individual, acquisition means operable when the authentication by the authentication means results in failure in the verification of the biometrics for acquiring biometrics data of the user who has requested for the authentication, and substitute authentication means for substituting the verification of biometrics when the biometrics data is acquired by the acquisition means.

According to another aspect of the present invention, there is provided a user authentication method, comprising the steps of authenticating a user by verification of biometrics which is a biological characteristic unique to an individual, acquiring, when the authentication results in failure in the verification of the biometrics, biometrics data of a user who has requested for the authentication, and performing substitution authentication for substituting the verification of biometrics when the biometrics data are acquired by the acquisition means.

Preferably, the user authentication method further comprises a step of storing the biometrics data acquired by the step of acquiring the biometrics data, and search and pursuit of an illegal user are performed based on the stored biometrics data.

Alternatively, the user authentication method may further comprise a step of discriminating whether or not biometrics data inputted so as to be used for the verification of biometrics have a quality suitable for automatic verification, and a step of storing the acquired biometrics data when it is discriminated that the biometrics data do not have a quality suitable for automatic comparison. The user authentication method may further comprise a step of discriminating, when it is discriminated that the biometrics data do not have a quality suitable for automatic comparison, whether or not the biometrics data have a quality suitable for use for the search and the pursuit of an illegal user, and wherein, when it is discriminated that the biometrics data are suitable for use for the search and the pursuit of an illegal user, use of the substitute authentication is permitted. The discrimination of whether or not the biometrics data are suitable for use for the search and the pursuit of an illegal user may depend upon discrimination of whether or not the inputted biometrics data are proper and inputted by the user at the place is used. A correlation of a plurality of biometrics data acquired by the step of acquiring the biometrics data may be measured to perform discrimination of whether or not the biometrics data are inputted by the user at the place.

At least a fingerprint may be used as the biometrics.

Upon storage of biometrics data prior to the substitute authentication, at least an image of the face and/or a figure when a fingerprint may be inputted are photographed.

In the user authentication apparatus and the user authentication method, if authentication by verification of biometrics results in failure, then biometrics data of the user who has requested for the authentication are acquired, and verification of biometrics is substituted after the biometrics data of the user are acquired. Therefore, when it later becomes clear that illegal accessing to entrance gate management or illegal log-in to a computer system was executed, the person who posed illegally can be specified. Consequently, the user authentication apparatus and the user authentication method are advantageous in that, even where biometrics input data of some user such as a fingerprint are low in quality and are not suitable for verification, the security of the entire system can be augmented without giving rise to an increase in cost by introduction of significant additional hardware.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENTS

Figure 1:
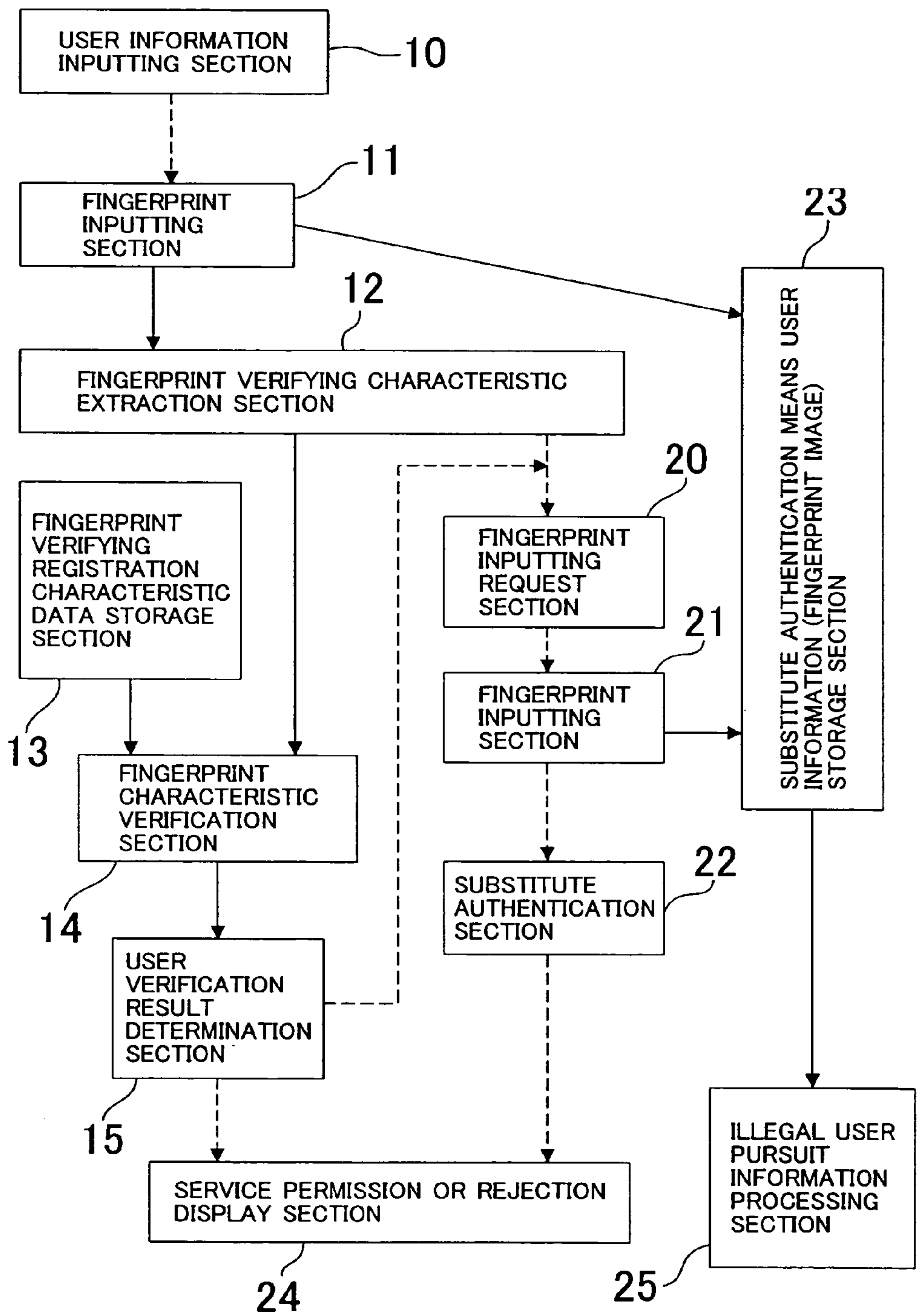
FIG. 1 is a block diagram showing a configuration of a user authentication apparatus to which the present invention is applied.

Referring first to FIG. 1, there is shown a configuration of a user authentication apparatus to which the present invention is applied. In the user authentication apparatus of the present embodiment, a fingerprint is used as biometrics. It is to be noted that broken lines in FIG. 1 indicate a flow of a processing procedure (control) and solid lines indicate a flow of data such as fingerprint data.

The user authentication apparatus includes a user information inputting section 10, a fingerprint inputting section 11, a fingerprint verifying characteristic extraction section 12, a fingerprint verifying registration characteristic data storage section 13, a fingerprint characteristic verification section 14, a user verification result determination section 15, a fingerprint inputting request section 20, a fingerprint inputting section 21, a substitute authentication section 22 based on an inputted password, a substitute authentication means user information storage section 23, a service permission or rejection display section (hereinafter referred to simply as display section) 24, and an illegal user pursuit information processing section 25.

Figure 2:
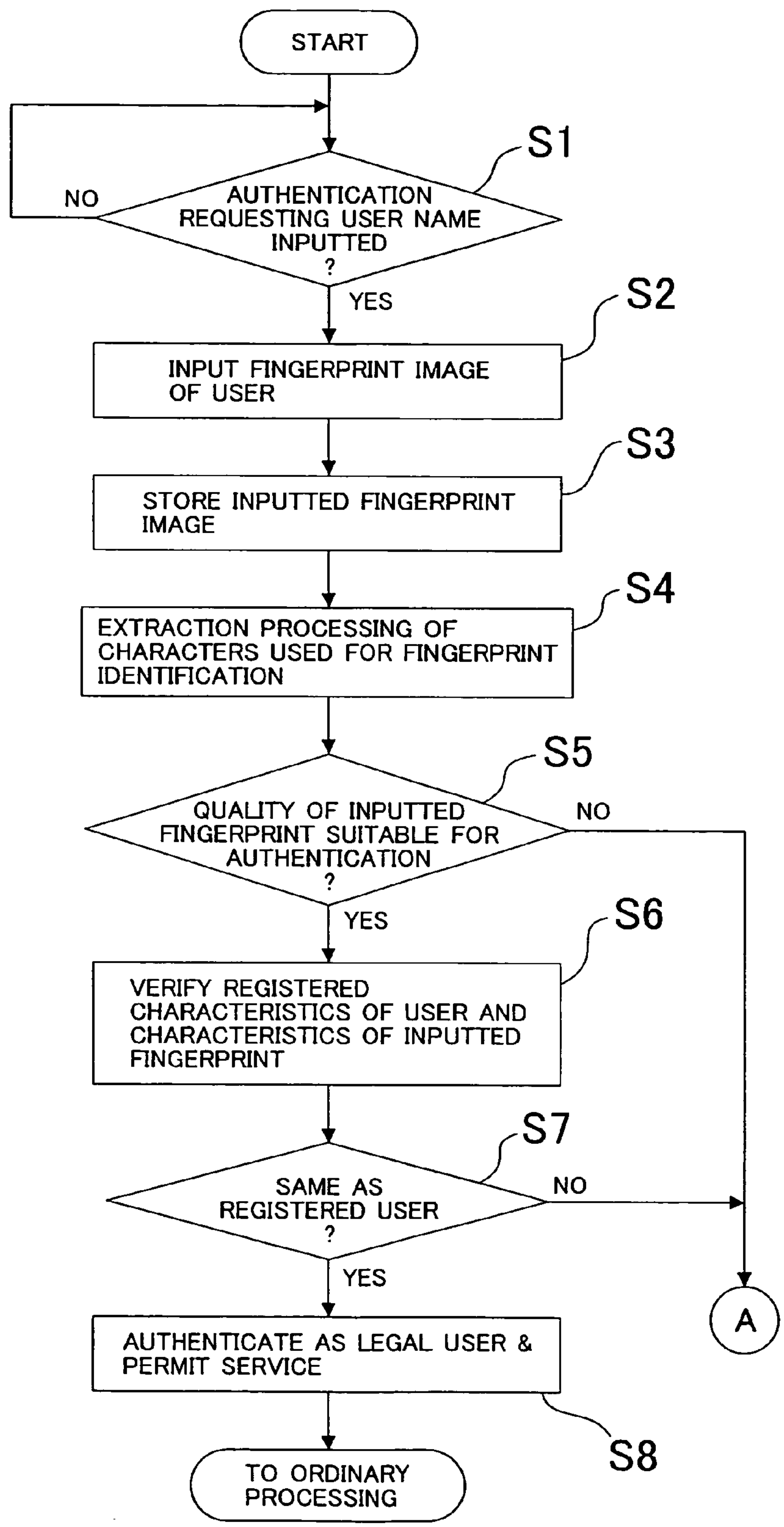
FIGS. 2 and 3 are flowcharts illustrating operation of the user authentication apparatus of FIG. 1.
Figure 3:
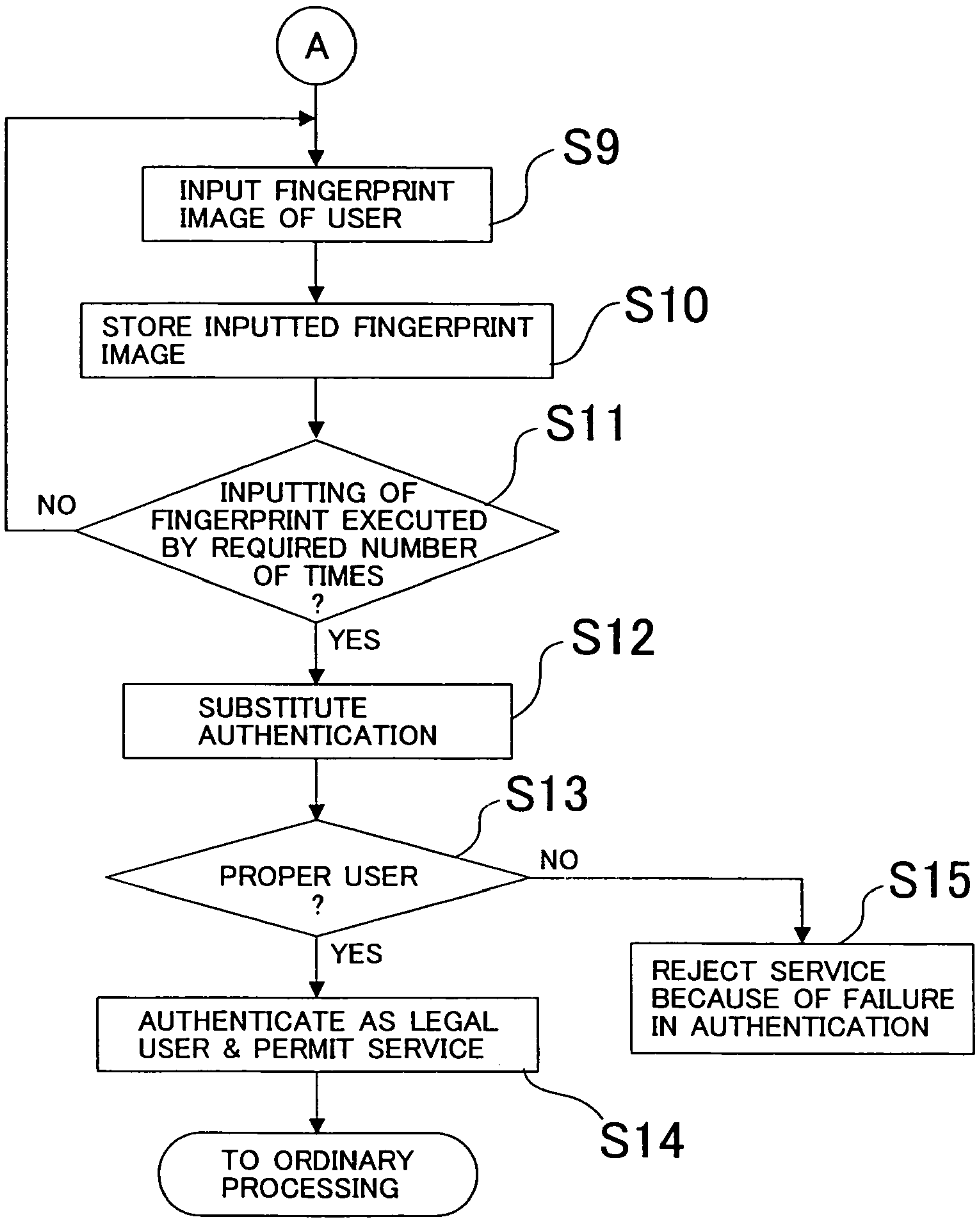

FIGS. 2 and 3 illustrate operation of the user authentication apparatus of FIG. 1, and operation of the user authentication apparatus is described with reference to FIGS. 1 to 3. It is to be noted that the processing operation illustrated in FIGS. 2 and 3 can be realized by the components of the user authentication apparatus which execute a program stored in a control memory not shown of the user authentication apparatus. The control memory may be a ROM (Read Only Memory), an IC (Integrated Circuit) memory or a like memory.

A user name of a user who requests for authentication in order to request for provision of a service is inputted from the user information inputting section 10 (step S1 of FIG. 2). Upon inputting of a user name, a user number may be inputted from ten keys or a user identifier is inputted from a keyboard, or otherwise an ID (Identification number) card of the magnetic type or the like may be used for such inputting.

In order to input a fingerprint image of the user, the fingerprint inputting section 11 picks up a fingerprint image of the user when a finger of the user touches with a fingerprint sensor (not shown). The fingerprint inputting section 11 further converts the image data of the fingerprint image into digital image data so as to allow later processing in the user authentication apparatus (step S2 of FIG. 2).

As a scheme of configuration of the fingerprint sensor, an optical system can be used wherein light emitted typically from an LED (Light Emitting Diode) is reflected by a prism and then converted into a digital image using a CCD (Charge Coupled Device). The conversion is performed utilizing the fact that the reflection factor is different between a ridge portion and a valley portion along a ridge of a finger placed on the outer side of the reflecting surface of the prism.

The fingerprint verifying characteristic extraction section 12 receives the fingerprint image obtained from the fingerprint inputting section 11 and executes a process of extracting characteristics for use for identification of the fingerprint from the fingerprint image (step S4 of FIG. 2).

A method of realizing extraction of characteristics for use for identification of a fingerprint is disclosed, for example, in Hiroshi Asai, Yukio Hoshino and Kazuo Kiji, "Automated Fingerprint Identification by Minutiae-Network Feature—Feature Extraction Processes—", the Transactions of the Institute of Electronics, Information, and Communication Engineers of Japan, Vol. J72-D-II, No. 5, May, 1989, pp. 724–732.

According to the method disclosed in the document, a ridge pattern is extracted from a variable density image including ridges by a binary digitization process and a thinning process, and positions of an end point and a branching point of any ridge are detected. Then, the number of intersecting ridges on a line segment interconnecting the end point and the branching point of the ridge is counted, and the relationship diagram is represented in digital data and used as fingerprint characteristics for verification.

In the process described, also the area of a region of the fingerprint image in which the image quality is sufficiently high to extract characteristics, the number of characteristics such as end points and branching points obtained by the characteristic extraction, reliability information applied to each characteristic by the automatic characteristic extraction process and other necessary information are calculated as additional information.

Further, the fingerprint verifying characteristic extraction section 12 discriminates based on a result of the characteristic extraction whether or not the inputted fingerprint has a quality suitable for authentication for which automatic finger print verification is used (step S5 of FIG. 2). In order to allow automatic fingerprint verification, it is necessary that the contrast in concave and convex geometry between ridges of the fingerprint and valleys between the ridges be sufficiently great. However, a fingerprint image is not sometimes obtained with a required quality particularly when the skin is dry or because of perspiration, damage, abrasion or the like of the skin. In such a case, it is discriminated that the fingerprint image has an insufficient quality.

In an available method of realizing the discrimination, it is discriminated whether or not typically the area of the region in which the image has a quality sufficiently high to extract characteristics, the numbers of the individual characteristics such as endpoints and branching points obtained from the characteristic extraction, the reliability information applied to the individual characteristics by the automatic characteristic extraction processing and so forth all obtained by the fingerprint verifying characteristic extraction section 12 individually or in combination are higher than threshold values for them determined in advance.

The fingerprint verifying registration characteristic data storage section 13 stores fingerprint characteristic information for verification and user unique information regarding the user who is the owner of the fingerprint in a corresponding relationship to each other. The user unique information includes information for identification of the user and types, ranges and so forth of services permitted to the user.

If the fingerprint verifying characteristic extraction section 12 discriminates that the fingerprint image has a sufficient quality, then the fingerprint characteristic verification section 14 verifies the fingerprint image to detect whether or not the registered characteristics regarding the user and the characteristics of the inputted fingerprint coincide with each other, that is, are sufficiently analogous to each other (step S6 of FIG. 2).

The fingerprint characteristic verification section 14 receives the fingerprint characteristics S determined from the fingerprint inputted by the user this time from the fingerprint verifying characteristic extraction section 12. Further, the fingerprint characteristic verification section 14 receives the fingerprint characteristic information F corresponding to the user name inputted as the user information from within the fingerprint characteristic information stored till then from the fingerprint verifying registration characteristic data storage section 13. Then, the fingerprint characteristic verification section 14 compares the fingerprint characteristic information F and the fingerprint characteristics S with each other and evaluates a score representative of a similarity which has a high value when the two kinds of information originate from the same finger.

The fingerprint characteristic verification section 14 compares the score with a threshold value set therefor in advance to discriminate whether or not the user which has given the fingerprint characteristics S is the same as the registered user (step S7 of FIG. 2). If the score is higher than the threshold value, then the fingerprint characteristic verification section 14 outputs an identification result of "the fingerprint coincides".

A typical method of realizing the verification for identification of an imprinting person using a fingerprint as described above is disclosed, for example, in Hiroshi Asai, Yukio Hoshino and Kazuo Kiji, "Automated Fingerprint Identification by Minutiae-Network Feature—Verification Processes—", the Transactions of the Institute of Electronics, Information, and Communication Engineers of Japan, Vol. J72-D-II, No. 5, May, 1989, pp. 733–740.

According to the method disclosed in the document, for each of two fingerprints for verification, the number of ridges intersecting with a line segment interconnecting an end point and a branching point of a ridge is counted and represented in digital data. The digital data are used for positioning of the fingerprints relative to each other, and the similarity between them is evaluated to realize verification.

When a result of the fingerprint verification indicates that the inputted fingerprint is sufficiently similar to the stored fingerprint characteristics stored with regard to the user, the user verification result determination section 15 authenticates that the user who has inputted the user information is the legal user and displays on the display section 24 that a service is permitted (step S8 of FIG. 2). On the other hand, when the fingerprint does not coincide, the user verification result determination section 15 determines that the authentication results in failure and rejects a service, and the fingerprint inputting request section 20 subsequently executes processing of performing substitute authentication.

The processing operation described above is performed when the fingerprint verifying characteristic extraction section 12 discriminates that the quality is sufficient to perform automatic verification. On the other hand, however, when the fingerprint verifying characteristic extraction section 12 discriminates that the quality is insufficient or when the authentication with the inputted fingerprint by the user verification result determination section 15 results in failure, the fingerprint inputting request section 20 issues a request to input a fingerprint to the fingerprint sensor by a plural number of times to the user (step S9 to S11 of FIG. 3). The reason why it is requested to input a fingerprint by a plural number of times is that it is intended to find out and exclude inputting of a spurious fingerprint thereby.

The fingerprint inputting section 21 performs inputting and acquisition of a fingerprint using a scheme similar to the fingerprint inputting section 11. Only when necessary fingerprint inputting is performed from the fingerprint inputting section 21 in accordance with the request of the fingerprint inputting request section 20, the user can advance to a next substitute authentication step by the substitute authentication section 22 (step S12 of FIG. 3).

As a substitute authentication method by the substitute authentication section 22, typically a method of inputting a personal identification number or a password from ten keys or a keyboard or another method of reading in from a magnetic card for certifying the holding person is available. If it is discriminated by one of the substitute authentication methods that the user is a legal user (step S13 of FIG. 3), then similarly as when it is authenticated by the biometrics automatic verification described above that the user is a legal user, it is authenticated that the user who has inputted the user information is a legal user, and it is displayed on the display section 24 that a service is permitted (step S14 of FIG. 3). In any other case, it is discriminated that the authentication results in failure, and it is displayed on the display section 24 that a service is rejected (step S15 of FIG. 3).

The substitute authentication means user information storage section 23 stores the image inputted first from the fingerprint inputting section 11 and the image inputted from the fingerprint inputting section 21 after the request by the fingerprint inputting request section 20 (step S3 of FIG. 2 and step S10 of FIG. 3). The stored images are later used for search and pursuit of an illegal user by the illegal user pursuit information processing section 25 when necessary.

Figure 4:
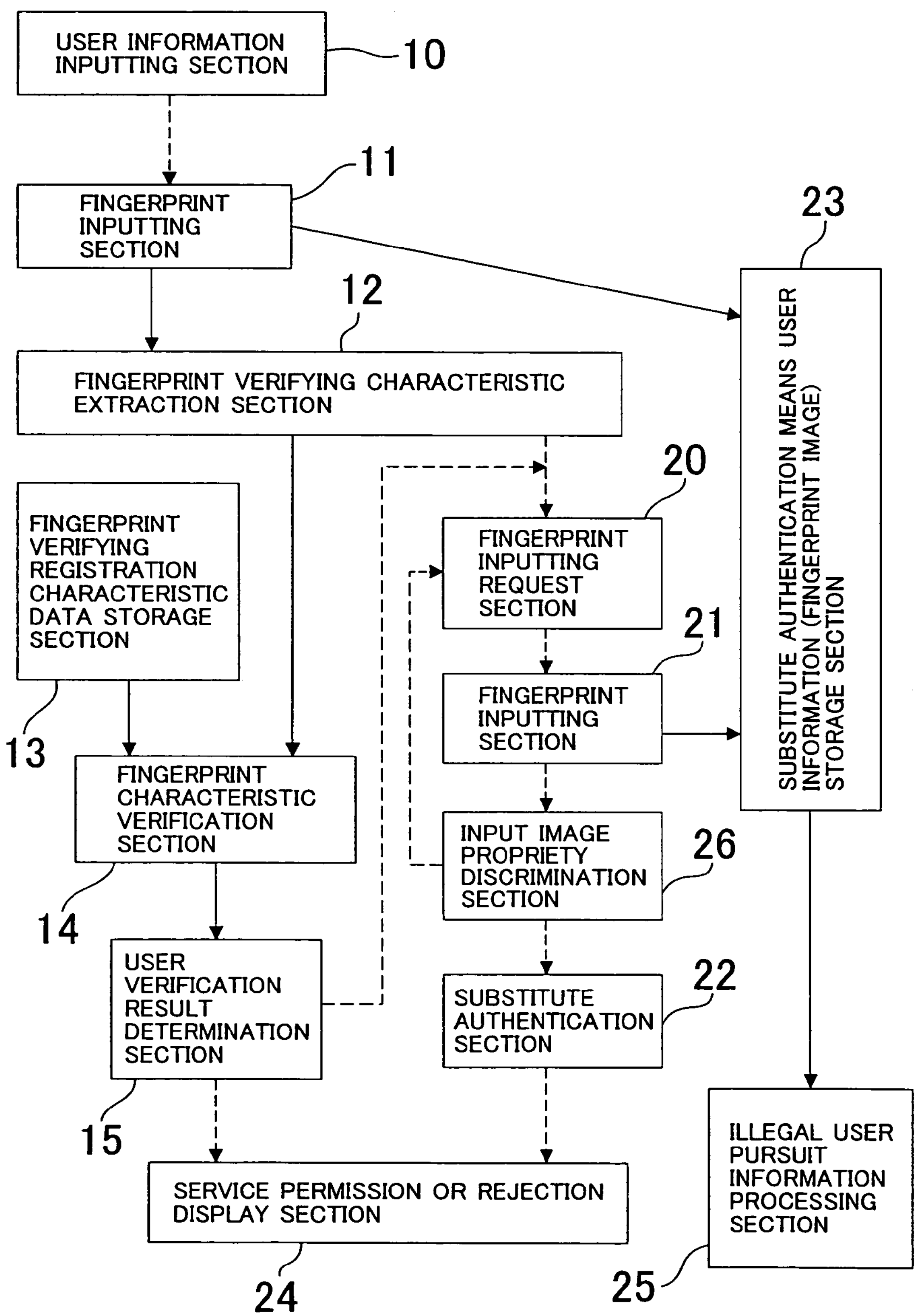
FIG. 4 is a block diagram showing a configuration of another user authentication apparatus to which the present invention is applied.

Referring now FIG. 4, there is shown a configuration of another user authentication apparatus to which the present invention is applied. The user authentication apparatus according to the present embodiment has a configuration similar to but different from that of the user authentication apparatus according to the present embodiment shown in FIG. 1 in that it additionally includes an input image propriety discrimination section 26. The common components operate in a similar manner as those of the user authentication apparatus of the first embodiment, and overlapping description of them is omitted herein to avoid redundancy.

Figure 5:
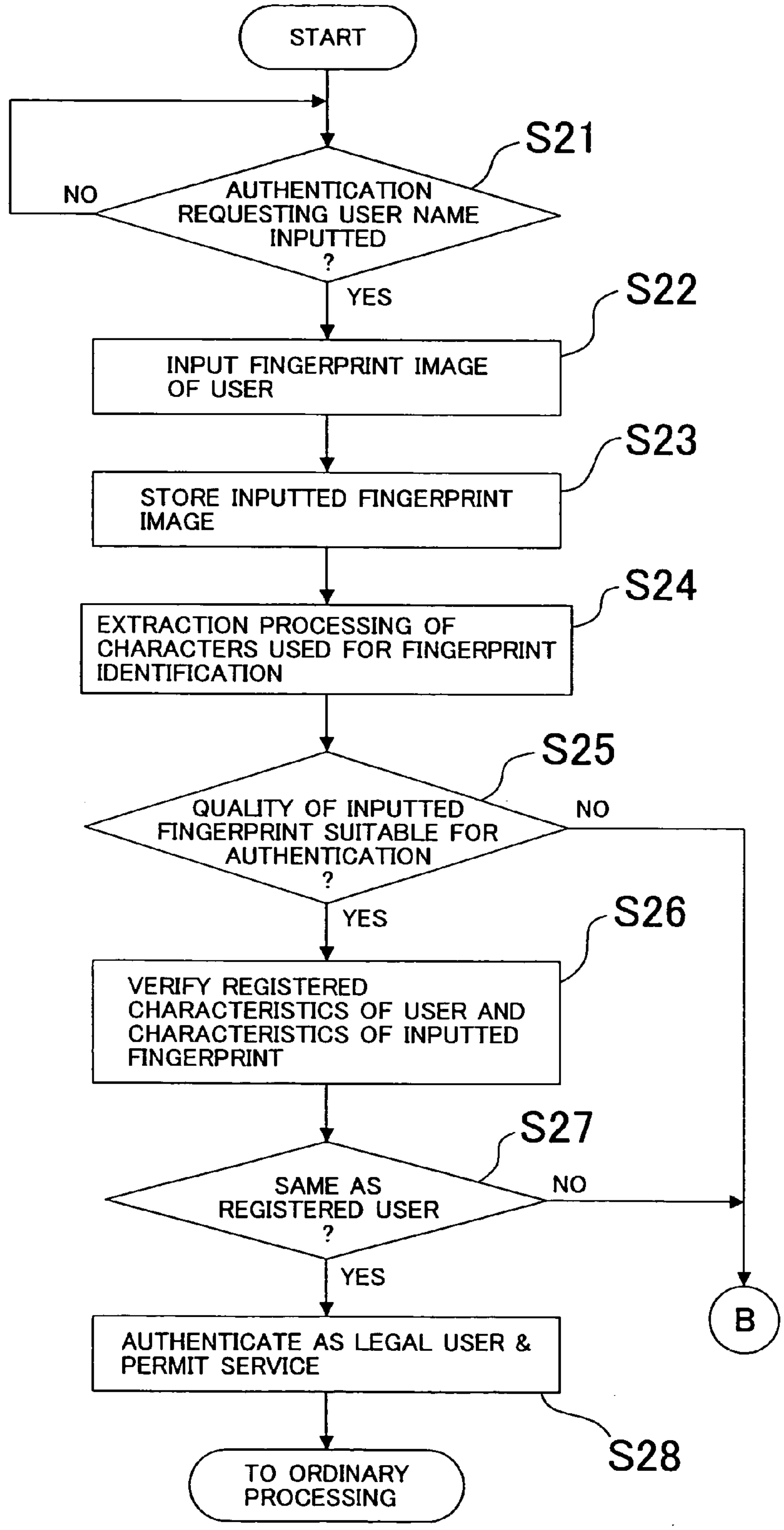
FIGS. 5 and 6 are flowcharts illustrating operation of the user authentication apparatus of FIG. 4.
Figure 6:
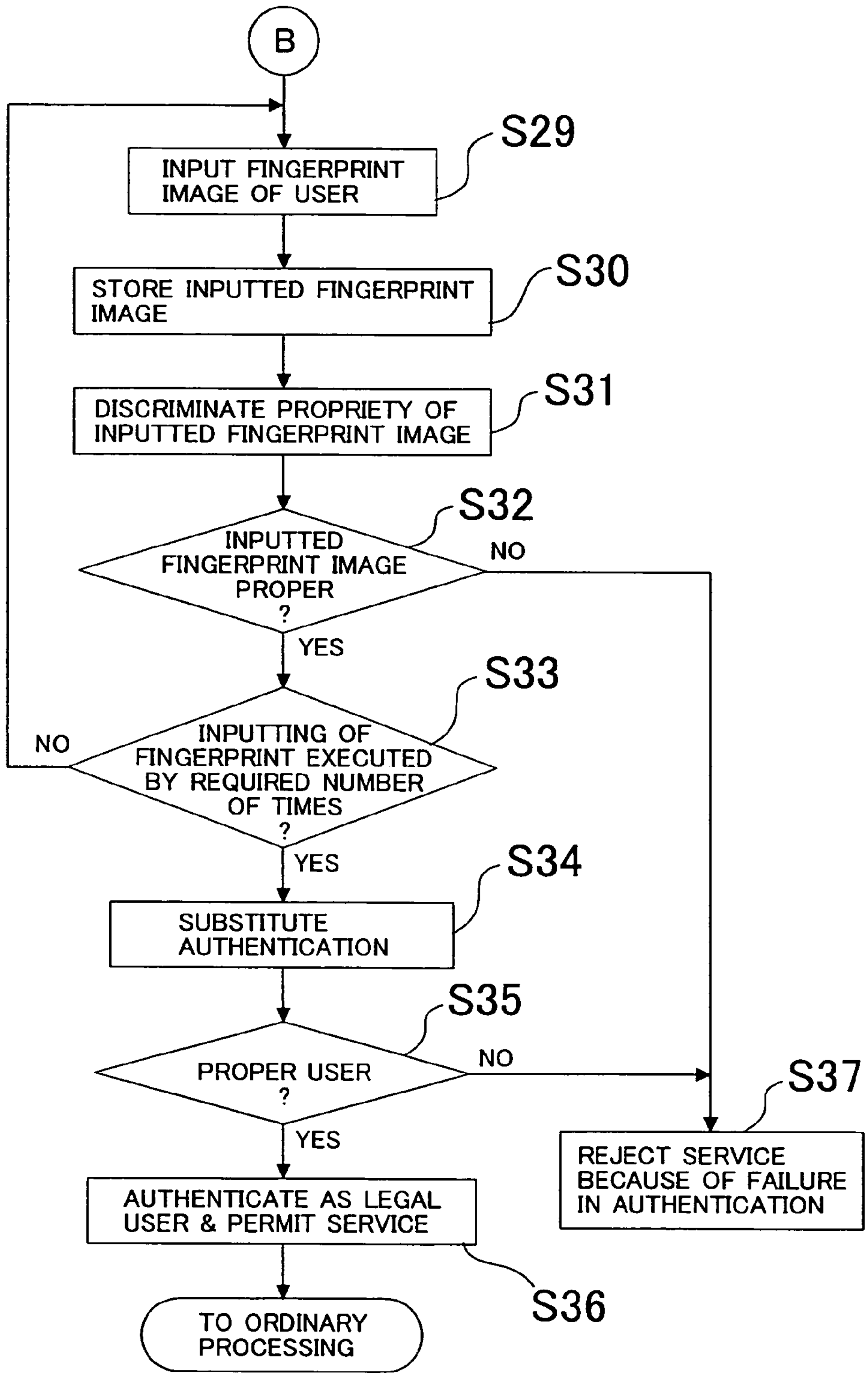

FIGS. 5 and 6 illustrate operation of the user authentication apparatus of FIG. 4, and operation of the user authentication apparatus is described with reference to FIGS. 4 to 6. It is to be noted that the processing operation illustrated in FIGS. 5 and 6 can be realized by the components of the user authentication apparatus which execute a program stored in the control memory not shown of the user authentication apparatus. The control memory may be a ROM, an IC memory or a like memory.

Of the processing operations illustrated in FIGS. 5 and 6, the operations in steps S21 to S30 and S33 to S37 are similar to the operations in steps S1 to S8 of FIG. 2 and steps S9 to S15 of FIG. 3, respectively. Thus, different or characteristic operations of the user authentication apparatus according to the second embodiment are described below.

In the user authentication apparatus according to the present embodiment, similarly as in the user authentication apparatus according to the first embodiment, when it is determined by the user authentication result determination section 15 that authentication based on a fingerprint inputted results in failure and substitute authentication by the substitute authentication section 22 is required, a request to input a fingerprint to the fingerprint sensor is issued from the fingerprint inputting request section 20 to the user. Consequently, the fingerprint inputting section 21 (step S29 of FIG. 6 acquires a fingerprint image).

The input image propriety discrimination section 26 discriminates whether or not the fingerprint image inputted from the input sensor is an image of a fingerprint of a finger presented properly by the user who requests for authentication for a service at present (steps S30 and S31 of FIG. 6).

Such images as given below should be discriminated and eliminated by the discrimination of the input image propriety discrimination section 26. In particular, (1) an image of a biological element presented by the user other than a fingerprint such as, for example, a portion of a finger other than a fingerprint, part of a palm, or a portion of the skin of some other part, and (2) an image of an element presented by the user which is not a biological part but imitates a fingerprint such as, for example, an element which is made imitating a finger from a material similar to the human body such as rubber or silicon and besides has a fingerprint of an unrelated person applied to the surface thereof, should be eliminated.

In order to eliminate presentation of an image based on such an imitated finger as described above, the input image propriety discrimination section 26 first evaluates a likelihood of the image to a fingerprint and uses as a criterion that the fingerprint likelihood is higher than a threshold value. For the evaluation of the fingerprint likelihood, a method is used wherein the image is divided into small regions and two-dimensional Fourier transform or the like is used for each of the small regions to determine a frequency distribution.

The ridges of a fingerprint of a human being have a stripe pattern having a pitch distribution restricted to some degree, and this can be confirmed by evaluating the distribution of peaks in the frequency distribution. Even if a fingerprint partially has a quality which is not suitable for automatic verification because it is damaged or is dry at the portion, the fingerprint must have a wide region over which its stripe pattern can be observed. The fingerprint and other portions can be distinguished from each other by the method just described.

In order to confirm that an element presented is a finger of a living body, a method of checking the similarity between a plurality of input images is used. A finger of a human being is resilient, and the possibility is high that the manner of deformation of a finger may be different each time it is impressed. If a plurality of impressed images coincide with each other even in their details, it is reasonable to determine that an imitated item (replica) having a resiliency different from that of a finger of a living body is presented and is not a proper impression.

Accordingly, if the positional correlation of the ridge pattern between a plurality of fingerprint images is significantly high when they are relatively positioned by parallel movement and revolution, then it is considered that the source of the image is a body which has rigidity to some degree. Then, by evaluating the degree, the body can be discriminated from the skin of a finger which has resiliency and must necessarily exhibit a different manner of deformation each time it is impressed.

Further, it is possible to pick up moving pictures while the impression area becomes wider after impression inputting of a finger is started on the input sensor and then becomes narrower until the impression is completed and evaluate the degree of deformation of the finger by its resiliency then from the obtained image sequence in the temporal direction to discriminate an input which does not match the resiliency of the finger. Also it is possible to use a method of checking whether or not sweat gland holes are present on a fingerprint image. Since sweat gland holes have a very fine structure on ridges, it is considered considerably difficult to work and imitate them on a replica.

Only when it is determined by such discrimination of the input image propriety discrimination section 26 as described above that the input image is a legal fingerprint input, the user can advance to the substitute authentication step by the substitute authentication section 22.

As a substitute authentication method by the substitute authentication section 22, typically a method of inputting a personal identification number or a password from ten keys or a keyboard or another method of reading in from a magnetic card for certifying the holding person is available. If it is discriminated by one of the substitute authentication methods that the user is a legal user, then similarly as when it is authenticated by the biometrics automatic verification described above that the user is a legal user, it is authenticated that the user who has inputted the user information is a legal user. Consequently, a service is permitted. In any other case, it is discriminated that the authentication results in failure, and a service is rejected.

The substitute authentication means user information storage section 23 stores the inputted image after the request by the fingerprint inputting request section 20 (step S30 of FIG. 6). The stored image is later used for search and pursuit of an illegal user by the illegal user pursuit information processing section 25 when necessary.

The configurations and the operations of the components of the first embodiment and the second embodiment of the present invention are described above, and in the following, examples of use of them are described. The present invention is applied typically to passer management (physical access control) through an entrance gate of important facilities, log-in management to a computer system which includes important information and so forth.

For example, in operation in a physical access control application, a user who requests for entry inputs a number N or the like for identification of the user itself from ten keys or the like and inputs a fingerprint S from the fingerprint sensor. The system discriminates coincidence between the fingerprint S and a fingerprint F which is identified with the inputted identification number N of the user from among a plurality of registered fingerprints stored therein. In actual verification, the similarity of characteristics for verification extracted from the fingerprint S and the fingerprint F is evaluated, and if the similarity is higher than a threshold valve, then it is determined that they coincide with each other.

The verification processing is performed automatically, and when the quality of the inputted fingerprint is not sufficient, it cannot be discriminated with sufficient confidence whether or not the fingerprints are of the same finger. When the user inputs a fingerprint of such a low quality as just described, conventionally a method is usually employed wherein it is determined that "authentication by an automatic verification process is impossible" and, as substitute measures, a request to input a special personal identification number or password is issued. Then, if an inputted personal identification number or password coincides with a registered one, then it is determined that the authentication results in success.

In the present system, when automatic verification does not result in success because the quality of an inputted image of a finger is insufficient, the fingerprint image inputted first is stored into the substitute authentication means user information storage section 23 and a request to input a fingerprint is issued again before substitute authentication is permitted.

The reason why a request to input a fingerprint is issued by a plural number of times in this manner is that it is intended to prevent an image of a counterfeit finger from being given and stored as it is. In order to prevent such storage of a counterfeit finger, a plurality of fingerprint images are compared with each other or a time series of images obtained from moving pictures which record a fingerprint impression are utilized as described hereinabove. The propriety of a plurality of images or a time series of images inputted is discriminated by the input image propriety discrimination section 26, and if the images are not of a fingerprint of a living body, substitute authentication is not permitted.

If an image inputted is a proper image, then this is stored into the substitute authentication means user information storage section 23, and the processing advances to substitute authentication by the substitute authentication section 22 which is based on inputting of a password. If the inputted password or personal identification number coincides with a registered one, then it is determined that the user is authenticated properly, and the user can enjoy a service.

The password or personal identification number inputted from ten keys, a keyboard or the like for substitute authentication can be entered even by an unrelated person through conjecture, furtive looking or the like, and this gives rise to the possibility of illegal accessing by a person who poses as the legal user. The present system provides measures for specifying, when it later becomes clear that illegal accessing to entrance gate management or illegal log-in to a computer system was executed, the person who posed illegally.

In particular, images stored in the substitute authentication means user information storage section 23 include fingerprint information of users who utilized the substitute authentication section 22 and can be utilized for search and pursuit of an illegal user by a manager or the like who visually observes the images. Since the range of users of such a system is limited in most cases, much information for pursuit can be obtained by visually comparing fingerprints of the users and the stored images with each other. This can be utilized for discovery or pursuit of an illegal user.

Although, in the forgoing description, a method wherein a fingerprint of a single finger is used as biometrics data is described, naturally it is possible to augment the security by inputting a plurality of fingers and using the fingers to discriminate the propriety of the input image (whether the user presents the living fingers properly) more strictly or by storing a fingerprint image of a plurality of fingers and using them for pursuit of an illegal user.

Further, while an example wherein user identification information is inputted from the user information inputting section 10 before a fingerprint is inputted is described, this is not necessarily essential. Where the fingerprint inputting by the fingerprint inputting section 11 is performed without inputting user identification information, the following procedure may be taken. First, extraction of characteristics from the inputted fingerprint is performed. Then, the fingerprint characteristic verification section 14 verifies the obtained characteristics successively with all of the fingerprint characteristic data stored in the fingerprint verifying registration characteristic data storage section 13. Further, the fingerprint characteristic verification section 14 permits a service or services to be provided to a registered user of the fingerprint which has the highest similarity score.

Although the first and second embodiments of the present invention are described taking a fingerprint as an example of biometrics, if the fingerprint sensor is replaced with a structure which accepts inputting of another type of biometrics (a biological characteristic unique to an individual) for automatic verification to allow extraction and verification of characteristics, then other biometrics such as a palm print, the face, an iris, a retina blood vessel pattern, a fist, handwriting, and a voiceprint can be used instead.

Also it is possible to use a fingerprint in ordinary biometrics authentication but use some other biometrics in storage of biometrics data prior to substitute authentication separately from or together with the fingerprint. For example, an image of the face may be picked up upon substitute authentication, or an image of a figure when a fingerprint is inputted may be picked up. Picking up of an image in a fingerprint inputting process by means of another camera can be utilized for discrimination of the propriety of whether or not a fingerprint is inputted properly by the input image propriety discrimination section 26. This is an effective method of storing information which exhibits its effect in later processing for pursuit of an illegal user.

In this manner, in searching for an attacker to the system who uses a service request posing as a related person and is a menace to authentication, stored fingerprint images can be used for a substitute authenticator.

Even if the stored fingerprint images have a quality insufficient for automatic verification upon log-in, they provide such information that is useful for manual search for an attacker. Since deception with a counterfeit finger is eliminated by the input image propriety discrimination section 26, an image indicates a clue or evidence regarding the attacker itself. Further, that a fingerprint image of the person itself is demanded also when a password is inputted has a determent effect against a posing attack and is effective to augmentation of the security of the entire system.

While preferred embodiments of the present invention have been described using specific terms, such description is for illustrative purposes only, and it is to be understood that changes and variations may be made without departing from the spirit or scope of the following claims.

What is claimed is:

1. A user authentication apparatus for authenticating a user by verification of biometrics which are presented by the user and are a biological characteristic unique to the individual user, comprising:

acquisition means operable when the authentication by the verification of the biometrics results in failure, for acquiring an additional image of the same biometric of the user for generating biometrics data of the user who has requested the authentication using a sensor and converting the acquired biometrics data into digital data; and storage means for storing the digital data obtained by the conversion by said acquisition means; and substitute authentication means for substituting the verification of biometrics when the biometrics data is acquired by said acquisition means and performing substitute authentication based on data other than the data acquired by said acquisition means.

2. A user authentication apparatus as claimed in claim 1, further comprising:

means for discriminating whether or not biometrics data inputted so as to be used for the verification of biometrics have a quality suitable for automatic verification, and means operable when it is discriminated that the biometrics data do not have an image quality sufficient for characteristic extraction in the verification of biometrics for storing the digital data obtained by the conversion by said acquisition means.

3. A user authentication apparatus for authenticating a user by verification of biometrics which are presented by the user and are a biological characteristic unique to the individual user, comprising:

acquisition means operable when the authentication by the verification of the biometrics results in failure, for acquiring biometrics data of the user who has requested the authentication using a sensor and converting the acquired biometrics data into digital data;

storage means for storing the digital data obtained by the conversion by said acquisition means;

substitute authentication means for substituting the verification of biometrics when the biometrics data is acquired by said acquisition means and performing substitute authentication based on data other than the data acquired by said acquisition means;

means for discriminating whether or not biometrics data inputted so as to be used for the verification of biometrics have a quality suitable for automatic verification, and means operable when it is discriminated that the biometrics data do not have an image quality sufficient for characteristic extraction in the verification of biometrics for storing the digital data obtained by the conversion by said acquisition means; and means operable when it is discriminated that the biometrics data do not have an image quality sufficient for the characteristic extraction for discriminating whether or not the biometrics data are legal biometrics data of the biological characteristic, and wherein, when it is discriminated that the biometrics data are the legal biometrics data of the biological characteristic, use of said substitute authentication means is permitted.

4. A user authentication apparatus as claimed in claim 3, wherein the discrimination of whether or not the biometrics data are the legal biometrics data depends upon discrimination of whether or not the inputted biometrics data are proper and inputted by the user at the place.

5. A user authentication apparatus as claimed in claim 4, wherein a correlation of a plurality of biometrics data acquired using said sensor is measured to perform discrimination of whether or not the biometrics data are inputted by the user at the place.

6. A user authentication apparatus as claimed in claim 1, wherein at least a fingerprint is used as the biometrics.

7. A user authentication apparatus as claimed in claim 1, wherein, upon the storage of the biometrics data acquired using said sensor, at least an image of an inputting process of a fingerprint is photographed and stored.

8. A user authentication apparatus as claimed in claim 1, wherein, upon storage of biometrics data prior to the substitute authentication, at least an image of the face and/or a figure when a fingerprint is inputted are photographed.

9. A user authentication method, comprising the steps of:

authenticating a user by verification of biometrics which is a biological characteristic unique to an individual;

acquiring, when the authentication results in failure in the verification of the biometrics, an additional image of the same biometric of the user for generating biometrics data of the user who has requested the authentication, and storing the biometrics data; and performing substitution authentication based on data other than the biometrics data for substituting the verification of biometrics when the biometrics data are acquired by said acquisition means.

10. A user authentication method as claimed in claim 9, further comprising a step of storing the biometrics data acquired by the step of acquiring the biometrics data, and search and pursuit of an illegal user are performed based on the stored biometrics data.

11. A user authentication method as claimed in claim 9, further comprising a step of discriminating whether or not biometrics data inputted so as to be used for the verification of biometrics have a quality suitable for automatic verification, and a step of storing the acquired biometrics data when it is discriminated that the biometrics data do not have a quality suitable for automatic comparison.

12. A user authentication method, comprising the steps of:

authenticating a user by verification of biometrics which is a biological characteristic unique to an individual;

acquiring, when the authentication results in failure in the verification of the biometrics, biometrics data of the user who has requested the authentication, and storing the biometrics data;

performing substitution authentication based on data other than the biometrics data for substituting the verification of biometrics when the biometrics data are acquired by said acquisition means;

discriminating whether or not biometrics data inputted so as to be used for the verification of biometrics have a quality suitable for automatic verification, and a step of storing the acquired biometrics data when it is discriminated that the biometrics data do not have a quality suitable for automatic comparison, discriminating, when it is discriminated that the biometrics data do not have a quality suitable for automatic comparison, whether or not the biometrics data have a quality suitable for use for the search and the pursuit of an illegal user, and wherein, when it is discriminated that the biometrics data are suitable for use for the search and the pursuit of an illegal user, use of the substitute authentication is permitted.

13. A user authentication method as claimed in claim 12, wherein the discrimination of whether or not the biometrics data are suitable for use for the search and the pursuit of an illegal user depends upon discrimination of whether or not the inputted biometrics data are proper and inputted by the user at the place is used.

14. A user authentication method as claimed in claim 13, wherein a correlation of a plurality of biometrics data acquired by the step of acquiring the biometrics data is measured to perform discrimination of whether or not the biometrics data are inputted by the user at the place.

15. A user authentication method as claimed in claim 9, wherein at least a fingerprint is used as the biometrics.

16. A user authentication method as claimed in claim 9, wherein, upon storage of biometrics data prior to the substitute authentication, at least an image of the face and/or a figure when a fingerprint is inputted are photographed.

* * * * *